US009792278B2

(12) United States Patent
Byron et al.

(10) Patent No.: US 9,792,278 B2
(45) Date of Patent: *Oct. 17, 2017

(54) METHOD FOR IDENTIFYING VERIFIABLE STATEMENTS IN TEXT

(71) Applicant: International Business Machines Corporation, Armonk, NY (US)

(72) Inventors: Donna K. Byron, Petersham, MA (US); James W. Murdock, IV, Millwood, NY (US); Timothy P. Winkler, Clinton, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/641,508

(22) Filed: Mar. 9, 2015

(65) Prior Publication Data

US 2016/0078018 A1   Mar. 17, 2016

Related U.S. Application Data

(63) Continuation of application No. 14/488,808, filed on Sep. 17, 2014.

(51) Int. Cl.
*G06F 17/27* (2006.01)
*G06N 5/04* (2006.01)
(Continued)

(52) U.S. Cl.
CPC ........ *G06F 17/2785* (2013.01); *G06F 17/278* (2013.01); *G06F 17/2775* (2013.01);
(Continued)

(58) Field of Classification Search
CPC ... G06F 17/2785; G06F 17/2775; G06N 5/04; G06N 99/005
(Continued)

(56) References Cited

U.S. PATENT DOCUMENTS

| 8,185,448 B1 | 5/2012 | Myslinski |
| 8,229,795 B1 | 7/2012 | Myslinski |

(Continued)

FOREIGN PATENT DOCUMENTS

CA   2588847   11/2013

OTHER PUBLICATIONS

"Information Extraction—a User Guide (Second Edition)" by Hamish Cunningham, Apr. 1999, Research memo CS-99-07, Institute for Language, Speech and Hearing [ILASH], and Department of Computer Science, University of Sheffield, England.*

(Continued)

*Primary Examiner* — Daniel Hess
(74) *Attorney, Agent, or Firm* — Terrile, Cannatti, Chambers & Holland, LLP; Stephen A. Terrile (57) ABSTRACT

A method, system and computer-usable medium are disclosed for identifying verifiable statements in a corpus of text. A training corpus of text containing manually annotated instances of verifiable and non-verifiable statements is processed to parse the text into segmented statements, which are in turn processed to extract features. The extracted features and the annotated statements are then processed with a machine learning algorithm to generate a verifiable statement classification model. In turn, the verifiable statement classification model is referenced by a verifiable statement classification system to distinguish verifiable and non-verifiable statements contained within an input corpus of text.

4 Claims, 5 Drawing Sheets

(51) Int. Cl.
*G06N 99/00* (2010.01)
*G06F 17/30* (2006.01)

(52) U.S. Cl.
CPC ......... *G06F 17/30654* (2013.01); *G06N 5/04* (2013.01); *G06N 99/005* (2013.01)

(58) Field of Classification Search
USPC .............................................. 704/9; 706/12
See application file for complete search history.

(56) References Cited

U.S. PATENT DOCUMENTS

| | | |
|---|---|---|
| 8,370,275 B2 | 2/2013 | Bhattacharya et al. |
| 2004/0122846 A1 | 6/2004 | Chess et al. |
| 2012/0317046 A1 | 12/2012 | Myslinski |
| 2012/0317593 A1 | 12/2012 | Myslinski |
| 2013/0138428 A1 | 5/2013 | Chandramouli et al. |
| 2013/0268519 A1 | 10/2013 | Cucerzan et al. |

OTHER PUBLICATIONS

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

R. High, "The Era of Cognitive Systems: An Inside Look at IBM Watson and How it Works," IBM Redbooks, 2012, pp. 1-15.

Yuan et al., "Watson and Healthcare," IBM developerWorks, 2011, pp. 1-9.

List of IBM Patents or Applications Treated as Related.

Hamish Cunningham, Information Extraction—a User Guide (Second Edition), Research Memo CS-99-07, Institute for Language, Speech and Hearing [ILASH], and Department of Computer Science, University of Sheffield, England, Apr. 1999.

\* cited by examiner

METHOD FOR IDENTIFYING VERIFIABLE STATEMENTS IN TEXT

BACKGROUND OF THE INVENTION

Field of the Invention

The present invention relates in general to the field of computers and similar technologies, and in particular to software utilized in this field. Still more particularly, it relates to a method, system and computer-usable medium for identifying verifiable statements in a corpus of text.

Description of the Related Art

Factual utterances assert something that may be true or false. In contrast, other utterances may have some other pragmatic role, such as opinions, declarations, exhortations, rhetorical exaggerations, and so forth. A subset of factual utterances is generally verifiable. For example, they may assert something that can be checked and potentially verified or falsified using authoritative sources. However, there may be many reasons why a factual utterance may not be verifiable. As an example, the factual utterance may be about the future. As another example, the factual utterance may involve information that would not be reported in an authoritative source.

Ingesting a document, such as a transcript of a speech or debate, and ingesting the verifiable statements it contains can prove challenging. Regardless, doing so is a common prerequisite for performing more complex Natural Language Processing (NLP) processing tasks, such as fact checking, search, summarization and so forth. For example, the following paragraph was included in President Obama's 2013 State of the Union speech:

"Our first priority is making America a magnet for new jobs and manufacturing. After shedding jobs for more than ten years, our manufacturers have added about 500,000 jobs over the last three. Caterpillar is bringing jobs back from Japan. Ford is bringing jobs back from Mexico. And this year, Apple will start making Macs in America again."

Within this paragraph, there are five claims that can be verified:

the US economy shed manufacturing jobs for more than 10 years

US manufacturers have added about 500,000 jobs over the past three years

Caterpillar is moving manufacturing jobs from Japan to the US

Ford is moving manufacturing jobs from Mexico to the US

Apple will make more Macs in the US in 2012 than they did in 2011

Likewise, the initial statement of "making America a magnet for new jobs and manufacturing" is a declaration. However, existing known approaches are unable to reliably perform these sorts of classifications. Furthermore, while approaches are likewise known for classifying subjective statements within the body of a text, their use in classifying objective statements is typically problematic and unreliable.

SUMMARY OF THE INVENTION

A method, system and computer-usable medium are disclosed for identifying verifiable statements in a corpus of text. In various embodiments, a training corpus of text containing manually annotated instances of verifiable and non-verifiable statements is processed to parse the text into segmented statements. The resulting segmented statements are then processed to extract features. In various embodiments, the extracted features may correspond to sentiment, verbs, verb tense, nouns, proper nouns, magnitude, velocity, importance, quantified items, quantitative comparison operators, or reference.

The extracted features and the annotated statements are then processed with a machine learning algorithm to generate a verifiable statement classification model. In turn, the verifiable statement classification model is referenced by a verifiable statement classification system to distinguish verifiable and non-verifiable statements contained within an input corpus of text. The statements that have been identified as verifiable are then provided to a downstream process or verification system for verification.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for identifying verifiable statements in a corpus of text. The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
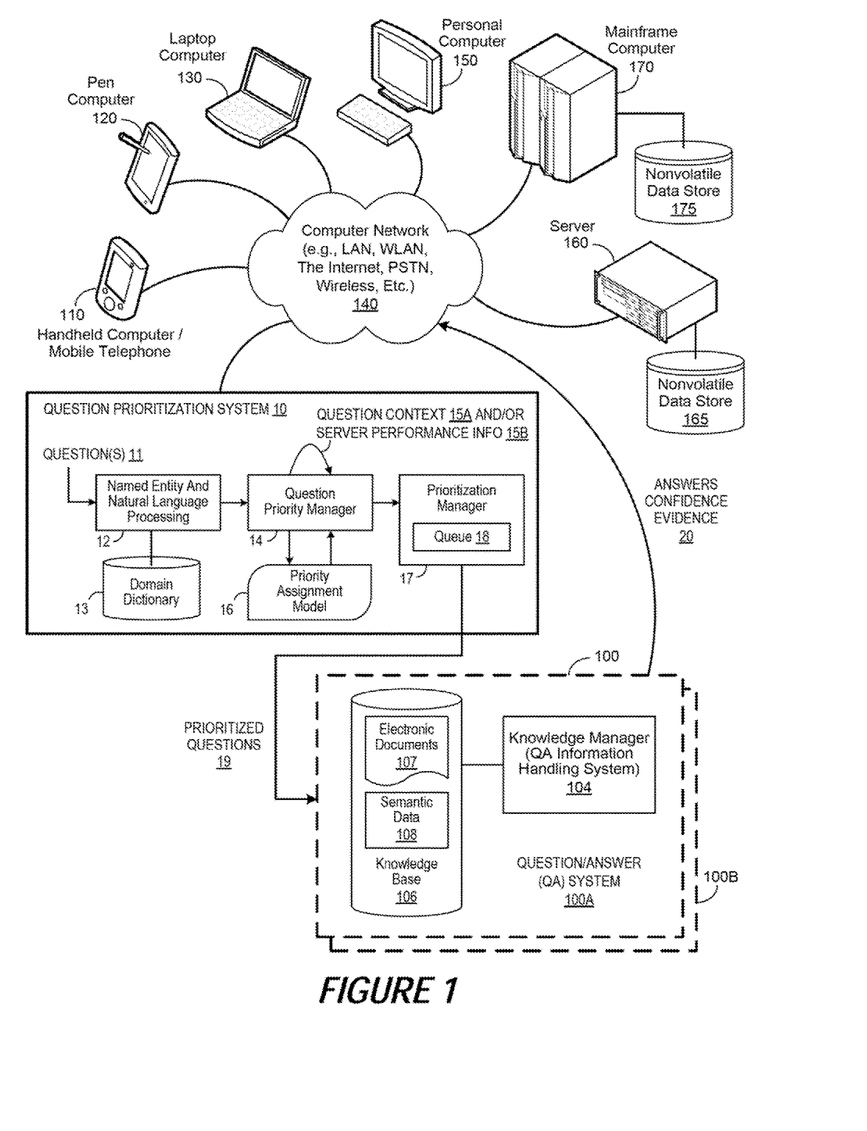
FIG. 1 depicts a schematic diagram of one illustrative embodiment of a question prioritization system and question/answer (QA) system connected to a computer network.

FIG. 1 depicts a schematic diagram of one illustrative embodiment of a question prioritization system 10 and question/answer (QA) system 100 connected to a computer network 140. The QA system 100 includes a knowledge manager 104 that is connected to a knowledge base 106 and configured to provide question/answer (QA) generation functionality for one or more content users who submit across the network 140 to the QA system 100. To assist with efficient sorting and presentation of questions to the QA system 100, the prioritization system 10 may be connected to the computer network 140 to receive user questions, and may include a plurality of subsystems which interact with cognitive systems, like the knowledge manager 100, to prioritize questions or requests being submitted to the knowledge manager 100.

The Named Entity subsystem 12 receives and processes each question 11 by using natural language (NL) processing to analyze each question and extract question topic information contained in the question, such as named entities, phrases, urgent terms, and/or other specified terms which are stored in one or more domain entity dictionaries 13. By leveraging a plurality of pluggable domain dictionaries relating to different domains or areas (e.g., travel, healthcare, electronics, game shows, financial services), the domain dictionary 11 enables critical and urgent words (e.g., "threat level") from different domains (e.g., "travel") to be identified in each question based on their presence in the domain dictionary 11. To this end, the Named Entity subsystem 12 may use a Natural Language Processing (NLP) routine to identify the question topic information in each question. As used herein, "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. For example, NLP can be used to derive meaning from a human-oriented question such as, "What is the tallest mountain in North America?" and to identify specified terms, such as named entities, phrases, or urgent terms contained in the question. The process identifies key terms and attributes in the question and compares the identified terms to the stored terms in the domain dictionary 13.

The Question Priority Manager subsystem 14 performs additional processing on each question to extract question context information 15A. In addition or in the alternative, the Question Priority Manager subsystem 14 may also extract server performance information 15B for the question prioritization system 10 and/or QA system 100. In selected embodiments, the extracted question context information 15A may include data that identifies the user context and location when the question was submitted or received. For example, the extracted question context information 15A may include data that identifies the user who submitted the question (e.g., through login credentials), the device or computer which sent the question, the channel over which the question was submitted, the location of the user or device that sent the question, any special interest location indicator (e.g., hospital, public-safety answering point, etc.), or other context-related data for the question. The Question Priority Manager subsystem 14 may also determine or extract selected server performance data 15B for the processing of each question. In selected embodiments, the server performance information 15B may include operational metric data relating to the available processing resources at the question prioritization system 10 and/or QA system 100, such as operational or run-time data, CPU utilization data, available disk space data, bandwidth utilization data, etc. As part of the extracted information 15A/B, the Question Priority Manager subsystem 14 may identify the SLA or QoS processing requirements that apply to the question being analyzed, the history of analysis and feedback for the question or submitting user, and the like. Using the question topic information and extracted question context and/or server performance information, the Question Priority Manager subsystem 14 is configured to populate feature values for the Priority Assignment Model 16 which provides a machine learning predictive model for generating a target priority values for the question, such as by using an artificial intelligence (AI) rule-based logic to determine and assign a question urgency value to each question for purposes of prioritizing the response processing of each question by the QA system 100.

The Prioritization Manager subsystem 17 performs additional sort or rank processing to organize the received questions based on at least the associated target priority values such that high priority questions are put to the front of a prioritized question queue 18 for output as prioritized questions 19. In the question queue 18 of the Prioritization Manager subsystem 17, the highest priority question is placed at the front for delivery to the assigned QA system 100. In selected embodiments, the prioritized questions 19 from the Prioritization Manager subsystem 17 that have a specified target priority value may be assigned to a specific pipeline (e.g., QA System 100A) in the QA system cluster 100. As will be appreciated, the Prioritization Manager subsystem 17 may use the question queue 18 as a message queue to provide an asynchronous communications protocol for delivering prioritized questions 19 to the QA system 100 such that the Prioritization Manager subsystem 17 and QA system 100 do not need to interact with a question queue 18 at the same time by storing prioritized questions in the question queue 18 until the QA system 100 retrieves them. In this way, a wider asynchronous network supports the passing of prioritized questions as messages between different computer systems 100A, 100B, connecting multiple applications and multiple operating systems. Messages can also be passed from queue to queue in order for a message to reach the ultimate desired recipient. An example of a commercial implementation of such messaging software is IBM's WebSphere MQ (previously MQ Series). In selected embodiments, the organizational function of the Prioritization Manager subsystem 17 may be configured to convert over-subscribing questions into asynchronous responses, even if they were asked in a synchronized fashion.

The QA system 100 may include one or more QA system pipelines 100A, 100B, each of which includes a computing device 104 (comprising one or more processors and one or more memories, and potentially any other computing device elements generally known in the art including buses, storage devices, communication interfaces, and the like) for processing questions received over the network 140 from one or more users at computing devices (e.g., 110, 120, 130) connected over the network 140 for communication with each other and with other devices or components via one or more wired and/or wireless data communication links, where each communication link may comprise one or more of wires, routers, switches, transmitters, receivers, or the like. In this networked arrangement, the QA system 100 and network 140 may enable question/answer (QA) generation functionality for one or more content users. Other embodiments of QA system 100 may be used with components, systems, sub-systems, and/or devices other than those that are depicted herein.

In each QA system pipeline 100A, 100B, a prioritized question 19 is received and prioritized for processing to generate an answer 20. In sequence, prioritized questions 19 are dequeued from the shared question queue 18, from which they are dequeued by the pipeline instances for processing in priority order rather than insertion order. In selected embodiments, the question queue 18 may be implemented based on a "priority heap" data structure. During processing within a QA system pipeline (e.g., 100A), questions may be split into many subtasks which run concurrently. A single pipeline instance can process a number of questions concurrently, but only a certain number of subtasks. In addition, each QA system pipeline may include a prioritized queue (not shown) to manage the processing order of these subtasks, with the top-level priority corresponding to the time that the corresponding question started (earliest has highest priority). However, it will be appreciated that such internal prioritization within each QA system pipeline may be augmented by the external target priority values generated for each question by the Question Priority Manager subsystem 14 to take precedence or ranking priority over the question start time. In this way, more important or higher priority questions can "fast track" through the QA system pipeline if it is busy with already-running questions.

In the QA system 100, the knowledge manager 104 may be configured to receive inputs from various sources. For example, knowledge manager 104 may receive input from the question prioritization system 10, network 140, a knowledge base or corpus of electronic documents 106 or other data, a content creator 108, content users, and other possible sources of input. In selected embodiments, some or all of the inputs to knowledge manager 104 may be routed through the network 140 and/or the question prioritization system 10. The various computing devices (e.g., 110, 120, 130, 150, 160, 170) on the network 140 may include access points for content creators and content users. Some of the computing devices may include devices for a database storing the corpus of data as the body of information used by the knowledge manager 104 to generate answers to cases. The network 140 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 104. The document 106 may include any file, text, article, or source of data (e.g., scholarly articles, dictionary definitions, encyclopedia references, and the like) for use in knowledge manager 104. Content users may access knowledge manager 104 via a network connection or an Internet connection to the network 140, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 104 may interpret the question and provide a response to the content user containing one or more answers to the question. In some embodiments, knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input prioritized question 19 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 140. Types of computer network 140 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
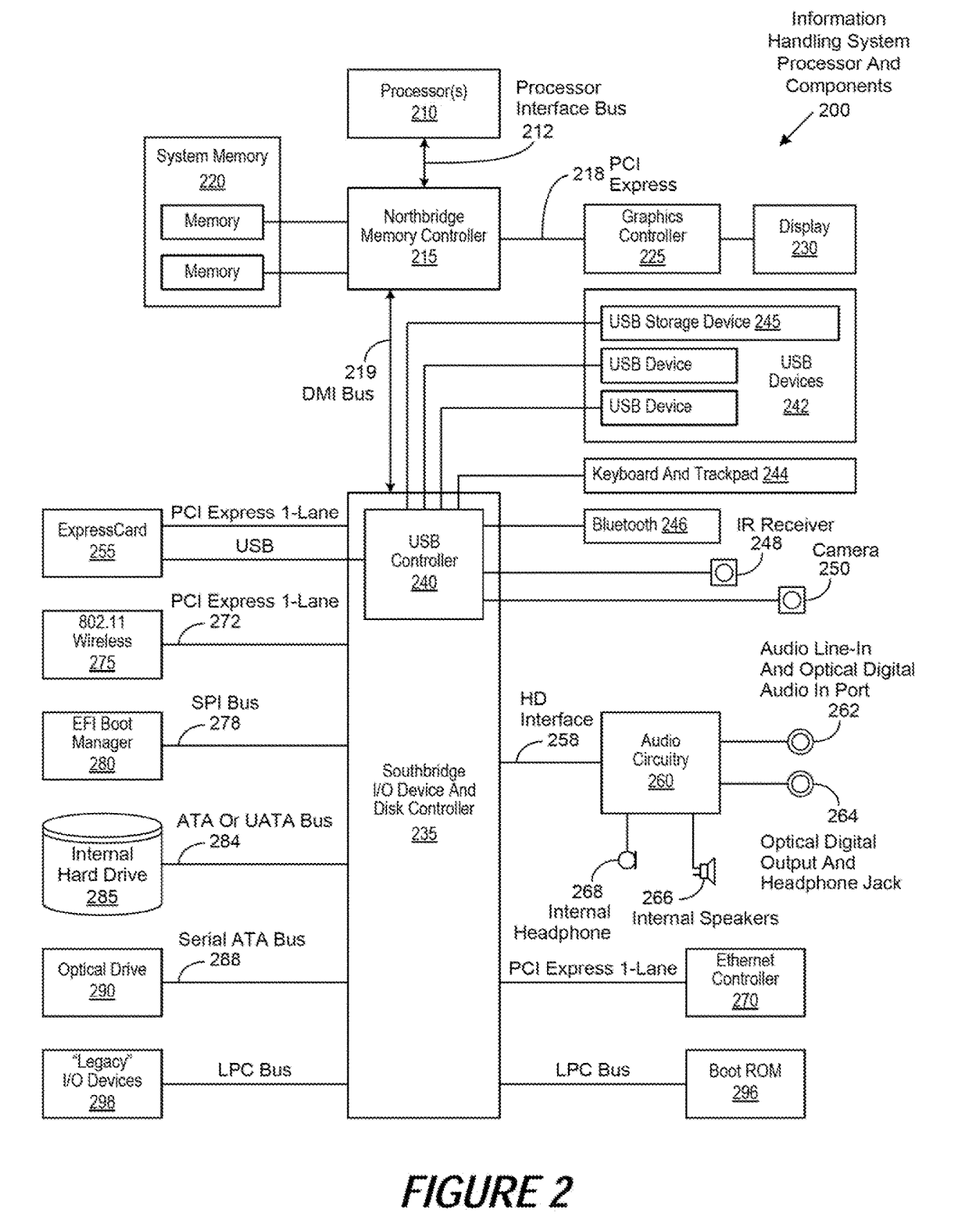
FIG. 2 is a simplified block diagram of an information handling system capable of performing computing operations.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
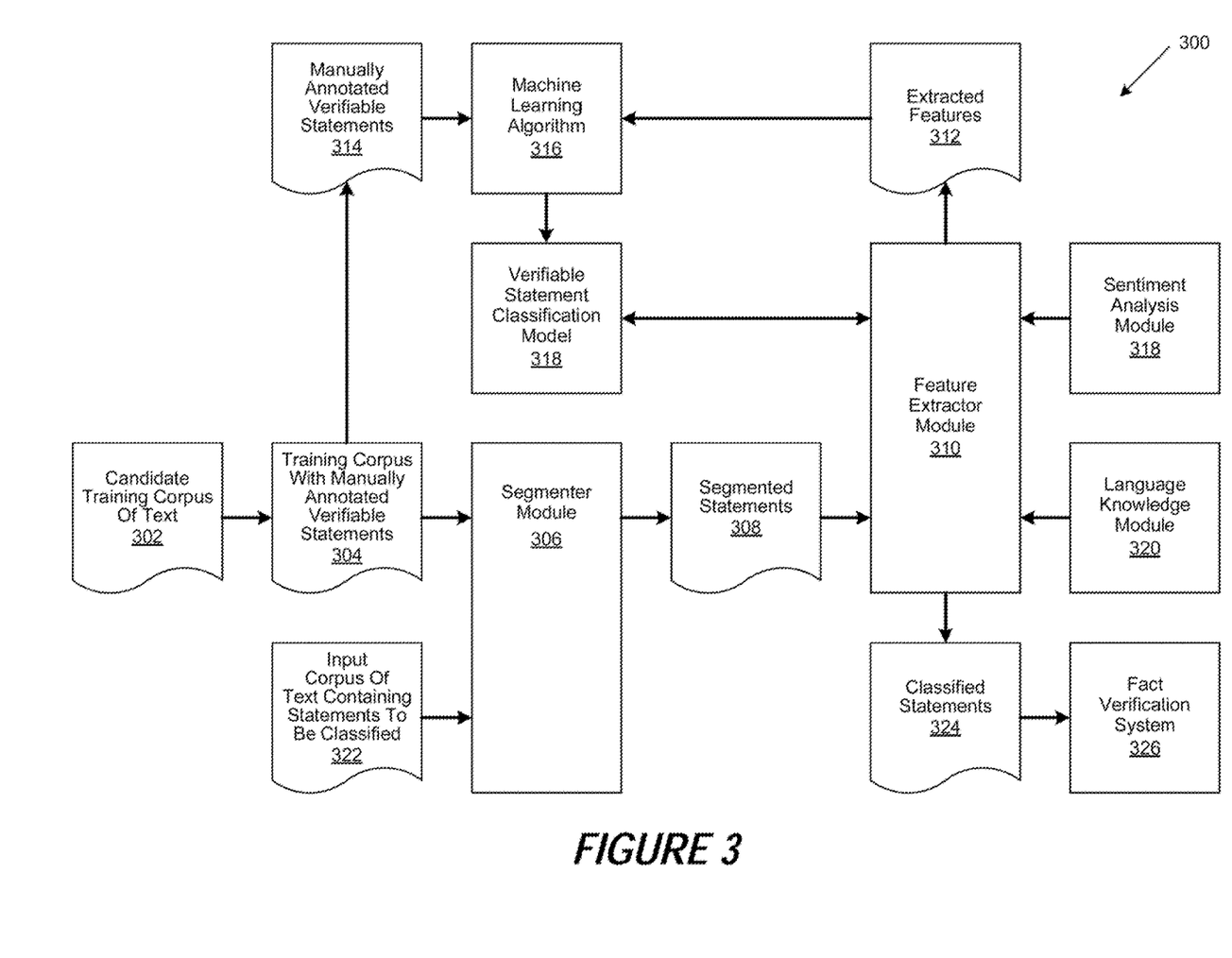
FIG. 3 is a simplified block diagram of a verifiable statement classification system.

FIG. 3 is a simplified block diagram of a verifiable statement classification system implemented in accordance with an embodiment of the invention. In various embodiments, a training corpus of text 302 containing manually annotated instances of verifiable and non-verifiable statements is processed to extract features 312. The extracted features 312 and the annotated statements 314 are then processed with a machine learning algorithm 316 to generate a verifiable statement classification model 318. In turn, the verifiable statement classification model 318 is referenced by a verifiable statement classification system 300 to distinguish verifiable and non-verifiable statements contained within an input corpus of text 322.

In various embodiments, the verifiable statement classification system 300 is implemented to distinguish between assertions within an input corpus of text 322 that state a claim that is appropriate for verification, as opposed to assertions that are either subjective in nature, related to private information states that cannot be verified, or are not conducive to checking. In these and other embodiments, the verifiable statement classification system 300 is not implemented to tag all objective statements contained in the input corpus of text 322. Instead, the input corpus of text 322 is processed to by the verifiable statement classification system 300 to automate the identification and classification of statements that contain objective claims that are amenable to external verification.

Skilled practitioners of the art will be aware that the field of sentiment analysis addresses a similar challenge, which is first identifying opinion statements, followed by then characterizing the topic and opinion expressed about that topic. Those of skill in the art will likewise be aware that opinion statements are not generally verifiable. However, the task of identifying verifiable statements is not as simple as identifying all statements that are not opinion statements as there are many utterances that are neither opinions nor verifiable, such as factual statements about the future. Other examples include factual statements about private information, declarations, exhortations, rhetorical exaggerations, and so forth.

It will likewise be appreciated that detecting deceptive statement is distinct from detecting whether a statement is verifiable. For example, a viewer may claim that a movie is really great when in fact they actually disliked it. In this example, the viewer is being deceptive but is not making a verifiable statement. Furthermore, known approaches such as pycho-linguistic observations about the viewer are more suited to determining whether an individual is being deceptive, not to determining whether an individual statement made by the individual is factual.

Referring now to FIG. 3, statements within a candidate training corpus of text 302 is manually annotated as verifiable or not verifiable to generate a training corpus of text 304. In various embodiments, the training corpus of text 304 is a preexisting corpus of text containing annotated statements that have been verified by a statement verification service, such as FactCheck.org. As an example, the training corpus of text 304 may include a series of statements, such as this paragraph in President Obama's 2014 State of the Union Speech: "Here are the results of your efforts: The lowest unemployment rate in over five years. A rebounding housing market. A manufacturing sector that's adding jobs for the first time since the 1990s. More oil produced at home than we buy from the rest of the world—the first time that's happened in nearly twenty years. Our deficits—cut by more than half. And for the first time in over a decade, business leaders around the world have declared that China is no longer the world's number one place to invest; America is." Within this paragraph, there are six claims that are verifiable through the use of an authoritative source and annotated as such within the training corpus of text 304. Likewise, the initial statement of "Here are the results of your efforts:" is a declaration and is annotated as not verifiable. In certain embodiments, the training corpus of text 304 is combined with a set of unlabeled arguments.

The training corpus of text 304 is then segmented into statements, such as independent clauses, by a segmenter module 304. In various embodiments, the segmenter module 304 is implemented to perform various segmentation operations, such as sentence segmentation, text segmentation, or a combination thereof. As used herein, sentence segmentation broadly refers to the process of determining text processing units consisting of one or more words and likewise identifying sentence boundaries between words in different sentences. Those of skill in the art will be aware that most written languages have punctuation marks which occur at sentence boundaries. Accordingly, sentence segmentation is frequently referred to as sentence boundary detection, sentence boundary disambiguation, or sentence boundary recognition. All these terms refer to the same task, which is determining how a corpus of text should be divided into sentences for further processing.

As likewise used herein, text segmentation broadly refers to the task of dividing a corpus of text into linguistically-meaningful units. As used herein, these linguistic units refer to the lowest level characters representing individual graphemes in a language's written system, words consisting of one or more characters, and sentences consisting of one or more words. Skilled practitioners of the art will be aware that it is difficult to successfully perform sentence and word segmentation independent from one another.

To continue the preceding example, the six statements within the President's 2014 State of the Union Speech that have been annotated as verifiable are segmented to generate the following verifiable statements:

The unemployment rate is the lowest in over five years

The housing market rebounding

The manufacturing sector is adding jobs for the first time since the 1990s

More oil is being produced In the US than is bought from the rest of the world for the first time in nearly twenty years Deficits have been cut by more than half.

Business leaders around the world have declared that America, not China, is the world's number one place to invest for the first time in a decade Likewise, the initial statement of "Here are the results of your efforts:" is segmented as a declaration that is not verifiable.

Features 312 are then extracted from the resulting segmented statements 308 by a feature extractor module 308. As used herein, feature extraction broadly refers to the process of simplifying the amount of resources required to accurately describe a large set of data. In certain embodiments, the feature extractor module 308 performs feature extraction operations by utilizing named entities, which refer to a place holder for a particular feature or piece of information. Examples of named entities include service names, product names, country names, proper names, and so forth. In certain embodiments, each named entity is associated with a list or grammar of possible phrases. For example, a named entity associated with a country may be associated with a list of names such as "US," "America," "China," and so forth.

In various embodiments, the extracted features 312 may include semantic features. In certain of these embodiments, the semantic features may be represented in a notational form to express the existence or non-existence of pre-established semantic properties. For example, the word "man" may be represented as [+HUMAN], [+MALE], [+ADULT], and the word "woman" may be represented as [+HUMAN], [−MALE], [+ADULT]. Likewise, the word boy may be represented as [+HUMAN], [+MALE], [−ADULT], and the word "girl" may be represented as [+HUMAN], [−MALE], [−ADULT]. The method by which the method by which the extracted features 312 are represented and notated is a matter of design choice. In various embodiments, the extracted features may correspond to sentiment, verbs, verb tense, nouns, proper nouns, magnitude, velocity, importance, quantified items, quantitative comparison operators, or reference.

The extracted features 312 and the annotated statements 314 within the training corpus of text 304 are then processed by a machine learning algorithm 316 to generate a verifiable statement classification model 318. In certain embodiments, the extracted features 312 and the annotated statements 314 within the training corpus of text 304 are processed by a machine learning algorithm 316 to update an existing verifiable statement classification model 318. In various embodiments, named entity phrases within the training corpus of text 304 may be used to construct grammars, regular expressions, or statistical models, such as the verifiable statement model 318.

In various embodiments, verifiable statement identification operations are initiated by first receiving an input corpus of text 322 containing statements to be classified as verifiable or not verifiable. For example, the input corpus of text 322 may include a paragraph of text, such as, "I am a board-certified cardiologist, and I received my medical degree from Johns Hopkins University twenty years ago. I find the practice of medicine rewarding on a personal level and I intend to continue my practice for another ten years."

Once the input corpus of text 322 has been received, it is then segmented into statements 308 by the segmenter module 306, as described in greater detail herein. To continue the example, the resulting segmented statements may include "I am a board-certified cardiologist," "I received my medical degree from Johns Hopkins University twenty years ago," "I find the practice of medicine rewarding on a personal level," and "I intend to continue my practice for another ten years."

In turn, the feature extractor module 310 processes the segmented statements 308, as described in greater detail herein, to classify them as verifiable or not verifiable by referencing them to the verifiable statement classification model 318. Continuing the example, the first two segmented statements are classified as being verifiable, as their veracity can be verified by an authoritative source, such as a medical board that issues licenses and the university that awarded the degree. However, the second two segmented statements are not verifiable, as they are personal assertions that cannot be verified by an authoritative source.

In various embodiments, the feature extractor module 310 may use the outputs of a sentiment analysis module 318 to classify the segmented statements 308 as verifiable or not verifiable. In certain embodiments, the feature extractor module 310 may use the outputs of a language knowledge module 320 to classify the segmented statements 308 as verifiable or not verifiable. In these embodiments, the language knowledge module 320 may provide information associated the segmented statements 308, such as verb tense (e.g., past, present, future), the number of proper nouns, or various metrics associated with the amount of publicly available information about each proper noun (e.g., the number of times that a proper noun occurs in Wikipedia).

In various embodiments, the language knowledge module 320 may likewise provide the feature extractor module 310 a list of known verbs, or adjectives that imply magnitude or velocity, such as "is increasing," "highest," and so forth. In certain embodiments, the language knowledge module 320 may likewise provide information to the feature extractor module 310 related to quantified items, such as "500,000 jobs," or predetermined semantic frames such as "manufacturers add jobs." In various embodiments, the relative importance of particular semantic frames may be determined based upon a set of training data, such as gathered from FactCheck.org or from fact-based sources such as newspapers and government reports. In certain embodiments, the language knowledge module 320 may likewise provide the feature extractor module 310 information related to quantitative comparison operators, such as "more than last year." Skilled practitioners of the art will recognize that many such embodiments are possible and the foregoing is not intended to limit the spirit, scope or intent of the invention.

In various embodiments, the segmented statements 308 are processed by a Natural Language Processing (NLP) system, familiar to those of skill in the art, to perform part-of-speech tagging and syntactic predicate-argument analysis. This analysis connects predicates and their arguments into semantic frames. As a result of this analysis process, a list of classified statements 324 to be verified is produced, along with associated NLP analysis-derived information, which can then be provided to downstream processes, such as a fact verification system 326, for verification. The design and operation of such downstream processes or factual verification systems are a matter of design choice.

Figure 4:
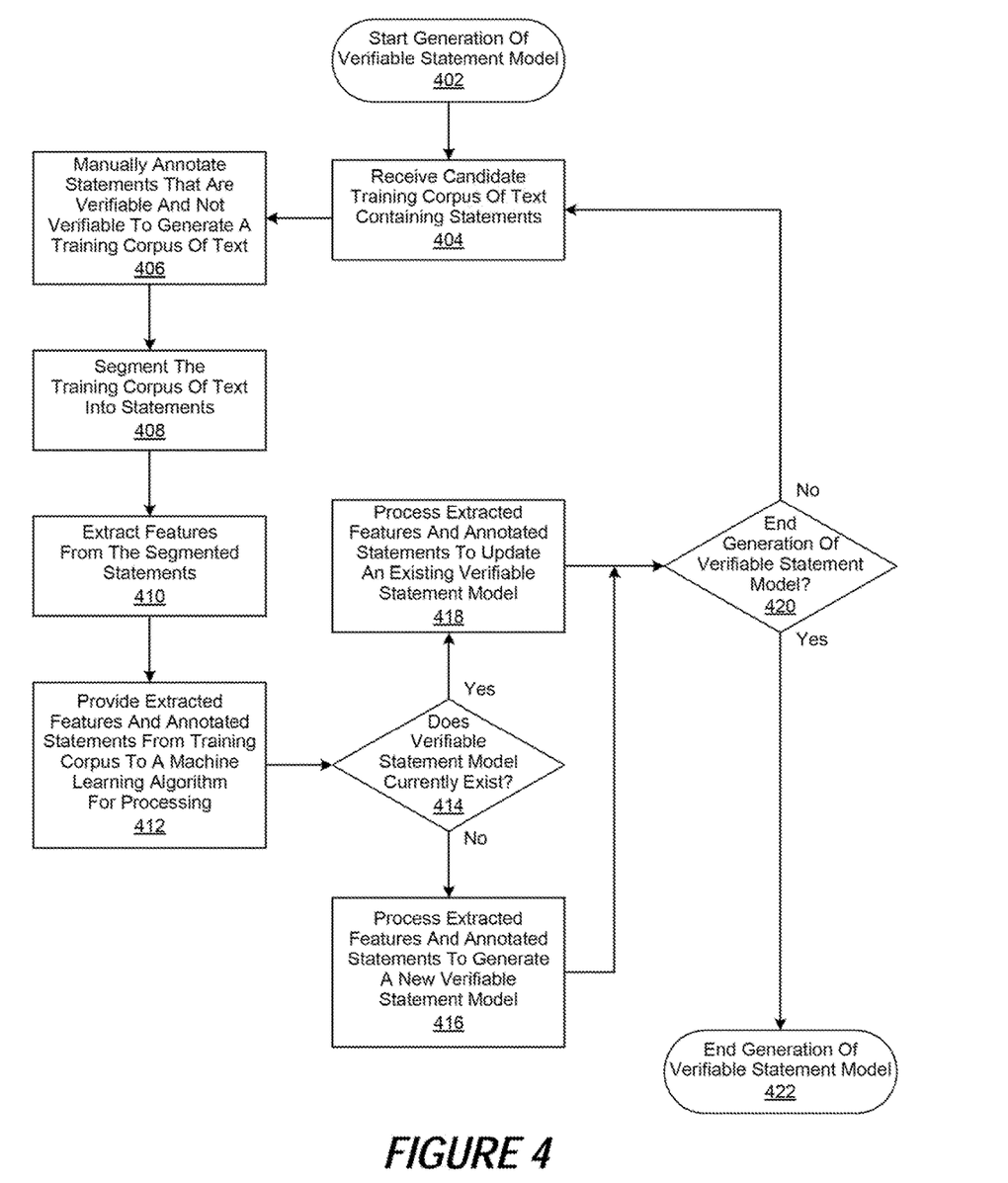
FIG. 4 is a generalized flowchart of the performance of operations to generate a verifiable statement classification model.

FIG. 4 is a generalized flowchart of operations performed in accordance with an embodiment of the invention to generate a verifiable statement classification model. In this embodiment, verifiable statement classification model generation operations are begun in step 402, followed by the receipt of a candidate training corpus of text containing statements in step 404. A training corpus of text is then generated in step 406 by manually annotating statements within the candidate training corpus of text 406 as verifiable or not verifiable. The resulting training corpus of text is segmented in step 408 into statements, such as independent clauses. In various embodiments, the training corpus of text is segmented by a segmenter module, such as the segmenter module 304 shown in FIG. 3.

Features are then extracted from the segmented statements in step 410. In various embodiments, the features are extracted from the segmented statements by a feature extractor module, such as the feature extractor module 308 shown in FIG. 3. The extracted features and the annotated statements within the training corpus of text are then provided in step 412 to a machine learning algorithm for processing, followed by a determination being made in step 414 whether a verifiable statement classification model currently exists. If not, the extracted features and the annotated statements within the training corpus of text are processed in step 416 by the machine learning algorithm to generate a new verifiable statement classification model. Otherwise, the extracted features and the annotated statements within the training corpus of text are processed in step 418 by the machine learning algorithm to update a target existing verifiable statement classification model.

Once the new verifiable statement classification model is generated in step 416, or a target existing verifiable statement classification model is updated in step 418, a determination is made in step 420 whether to end verifiable statement classification model generation operations. If not, then the process is continued, proceeding with step 404. Otherwise, verifiable statement classification model generation operations are ended in step 422.

Figure 5:
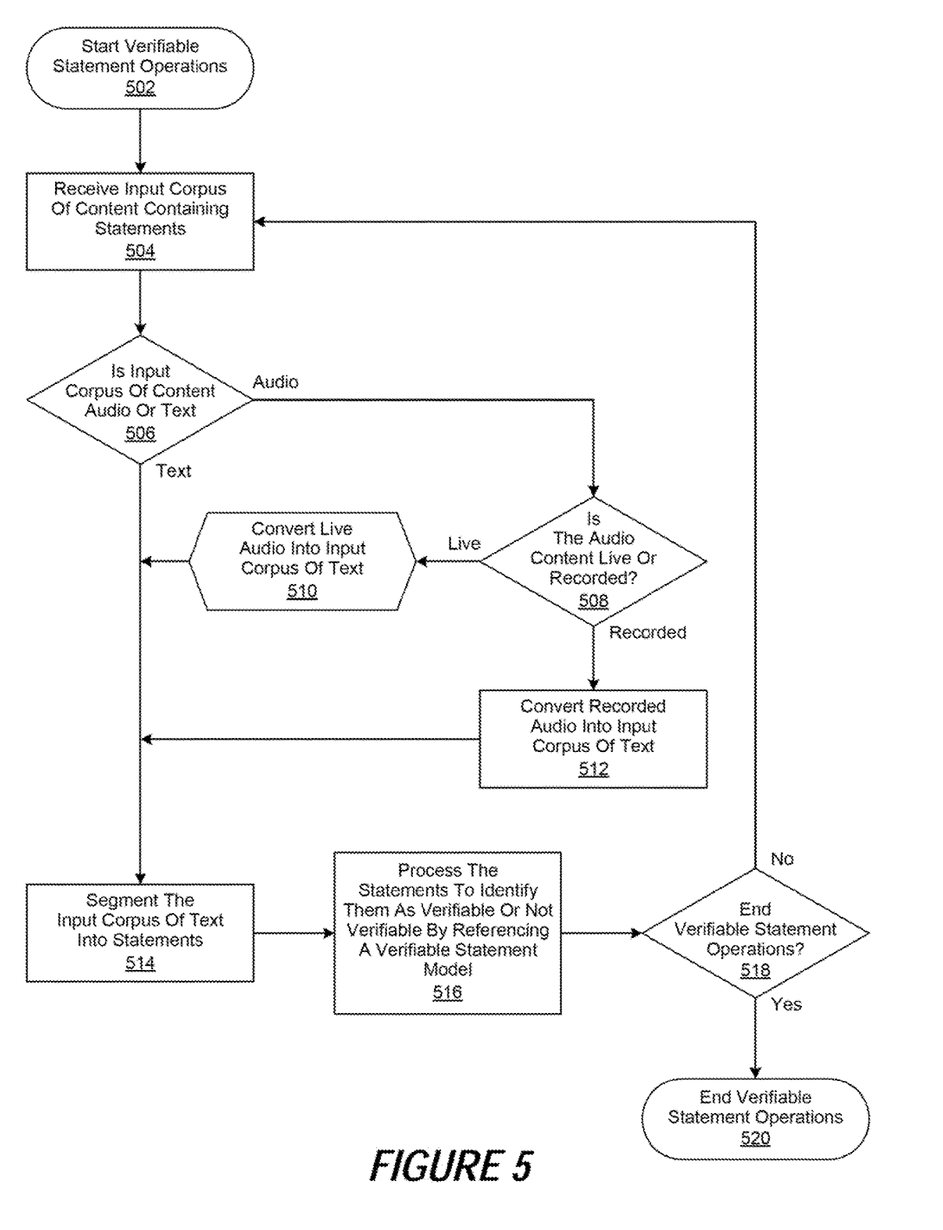
FIG. 5 is a generalized flowchart of the performance of operations to identify verifiable statements in a corpus of text.

FIG. 5 is a generalized flowchart of the performance of operations performed in accordance with an embodiment of the invention to identify verifiable statements in a corpus of text. In this embodiment, verifiable statement identification operations are begun in step 502, followed by the receipt of an input corpus of content containing statements in step 504. A determination is then made in step 506 whether the input corpus of content is in the audio or text form. For example, the input corpus of content may be a running audio of a speech in progress, the transcript of the same speech, or a document from some other source to be verified, such as a web page.

If it is determined in step 506 that the input corpus of content is in audio form, then a determination is made in step 508 whether the audio content is recorded or live. If it is determined in step 508 that the audio content is live, then it is converted into text in step 510. However, if it determined then the recorded audio content is converted to an input corpus of text in step 510. Otherwise, the recorded audio content is converted into an input corpus of text in step 512.

Once audio content has been converted into an input corpus of text in step 510 or 512, or if it was determined in step 506 that the input corpus of content was already in the form of text, the input corpus of text is then segmented into statements in step 514. The resulting statements are then processed in step 516 to classify them as verifiable or not verifiable by referencing them to a verifiable statement classification model, described in greater detail herein. A determination is then made in step 518 whether to end verifiable statement identification operations. If not, then the process is continued, proceeding with step 504. Otherwise, verifiable statement identification operations are ended in step 520.

Although the present invention has been described in detail, it should be understood that various changes, substitutions and alterations can be made hereto without departing from the spirit and scope of the invention as defined by the appended claims.

What is claimed is:

1. A computer-implemented method for identifying verifiable statements, comprising:

receiving a text containing a plurality of statements, the text received by a system configured to parse text input;

processing the text to parse the plurality of statements into segmented statements; and processing the segmented statements to identify individual segmented statements that are verifiable, the verifiable statement being a subset of factual utterances that can be checked and verified or falsified via an authoritative source, each individual segmented statement that is verifiable being identified as a verifiable statement, the verifiable statement comprising an objective claim that is amenable to external verification, the identification performed by the system;

processing the segmented statements to extract features associated with the statements via a feature extraction, the feature extraction simplifying an amount of resources required to accurately describe a large set of data, the feature extraction performed by the system, the features being extracted via the feature extraction comprising semantic features, the semantic features being represented in a notation form to express an existence or non-existence of pre-established semantic properties, the feature extraction being performed using a plurality of named entities, each of the plurality of named entities referring to a place holder for a particular feature or piece of information, the feature extraction receiving information regarding language knowledge, the information regarding language knowledge including information regarding magnitude, information regarding velocity and information regarding quantified items, the information regarding language knowledge being used when performing the feature extraction to classify the segmented statements as verifiable or not verifiable;

receiving a training text comprising annotated verifiable statements, the annotated verifiable statements being verified by a statement verification service; and processing the extracted features and the annotated verifiable statements to generate a verifiable statement classification model, the generation performed by the system, the verifiable statement classification model enabling automation of identification and classification of statements that contain objective claims that are not amenable to external verification; and wherein named entity phrases are used to construct grammars, regular expressions and the verifiable statement classification model, each named entity phrase being associated with a list of possible phrases.

2. The method of claim 1, wherein individual extracted features correspond to at least one member of the set of:

sentiment;

verbs;

verb tense;

nouns;

proper nouns;

magnitude;

velocity;

importance;

quantified items;

quantitative comparison operators; and reference.

3. The method of claim 1, wherein:

a machine learning algorithm is used by the system to perform the generation of the verifiable statement classification model.

4. The method of claim 3, wherein:

the system performs the identification by referencing the verifiable statement classification model.

\* \* \* \* \*